United States Patent [19]

Vergeer et al.

[11] Patent Number: 5,758,760
[45] Date of Patent: Jun. 2, 1998

[54] CONTINUOUS HAULAGE SYSTEM

[75] Inventors: Willem Cornelis Vergeer; Peter Koch. both of Secunda, South Africa

[73] Assignee: Sasol Mining (Proprietary) Limited, South Africa

[21] Appl. No.: 443,695

[22] Filed: May 18, 1995

[30] Foreign Application Priority Data

| May 20, 1994 | [ZA] | South Africa | 94/3497 |
| Nov. 30, 1994 | [ZA] | South Africa | 94/9521 |
| Nov. 30, 1994 | [ZA] | South Africa | 94/9522 |

[51] Int. Cl.⁶ .................................. B65G 41/00
[52] U.S. Cl. ........................... 198/303; 198/861.2
[58] Field of Search .................... 198/300, 303, 198/304, 861.2, 822, 823, 825, 844.1; 180/6.7, 9, 9.1, 9.62, 9.64

[56] References Cited

U.S. PATENT DOCUMENTS

| 2,250,933 | 7/1941 | Manierre | 198/303 |
| 2,543,368 | 2/1951 | Jones et al. | 198/303 X |
| 2,836,283 | 5/1958 | Horth | 198/303 |
| 2,850,147 | 9/1958 | Hill | 198/303 |
| 2,966,984 | 1/1961 | Moon | 198/303 |
| 3,135,374 | 6/1964 | Anderson | 198/303 |
| 3,701,411 | 10/1972 | McGinnis | 198/303 |
| 3,863,752 | 2/1975 | Sibley | 198/303 |
| 4,844,238 | 7/1989 | Lachner | 198/861.2 |
| 4,865,185 | 9/1989 | Bodimer | 198/861.2 |
| 5,096,048 | 3/1992 | Lachner et al. | 198/733 |
| 5,174,436 | 12/1992 | Wadell | 198/822 |
| 5,190,147 | 3/1993 | Pennington | 198/861.2 |

FOREIGN PATENT DOCUMENTS

| C0672279 | 2/1939 | Germany . |
| 834131 | 6/1983 | South Africa . |
| 838125 | 10/1983 | South Africa . |
| 870989 | 2/1987 | South Africa . |
| 921021 | 2/1992 | South Africa . |
| 928793 | 11/1992 | South Africa . |
| 2186857 | 10/1987 | United Kingdom . |

*Primary Examiner*—D. Glenn Dayoan
*Attorney, Agent, or Firm*—Ostrolenk, Faber, Gerb & Soffen, LLP

[57] ABSTRACT

A self-propelled articulated continuous haulage system including an elongated articulated body made up of a plurality of support frames aligned in endy-to-end abutting relationship. A conveyor system is carried by and supported centrally on the support frames. The haulage system includes a pair of endless traction chains carried on opposite sides of the support frames and spanning the length of the body the chains engaging the ground in an operative condition of the system, and a drive for driving the chains to provide tractive and steering effort for the system.

9 Claims, 18 Drawing Sheets

CONTINUOUS HAULAGE SYSTEM

BACKGROUND TO THE INVENTION

This invention relates to a continuous haulage system. In this specification a continuous haulage system is described for use in underground mining operations, especially mining operations involving continuous mining machines, but the invention is not confined to mining applications.

Numerous kinds of articulated continuous haulage systems have been developed to convey broken material underground. Such systems are characterized in that they support some kind of conveyor system and are either self-propelled or are capable of being hauled by suitable haulage means. Systems of this kind are advantageous in that they provide for continuous transport of the discharge from a continuous mining machine as the machine advances into a mine face. Such articulated continuous haulage systems are particularly useful in coal mining operations but are not confined thereto.

In order to be effective, these systems generally have to be of considerable length and therefore have to be capable of negotiating bends and turns in the underground mining environment. They also have to be capable of accommodating uneven ground conditions. Because of the harsh conditions existing underground continuous haulage systems have to be of robust construction and yet not of such high cost as to be uneconomical.

A self-propelled continuous haulage system of the kind described above must have an effective traction system to enable it to tram backwards and forwards. When tramming in either direction the haulage system must also be capable of being steered.

South African patent number 87/0989 to Bodimer discloses an articulated conveyor train which is supported by the floor of a mine and which is capable of traversing a curvilinear path while maintaining the conveyor run position of an orbital conveying belt in an operative mode. The conveyor train is supported on the lower run of a centrally located crawler chain which is capable of driving the train along the mine surface. Steering means are provided at the receiving end of the train and optionally at the discharge end thereof.

South African patent number 86/2541 to Lachner et al discloses a conveyor for use in mining operations having an endless revolving conveyor strand which is driven in its longitudinal direction by intermediate drives and which is guided on a conveyor frame consisting of segments which are multi-directionally pivotally connected to one another along the central longitudinal axis. The conveyor frame is provided with downwardly extensible support elements which lift the conveyor strand that is reversing in the lower stringer from the ground when the support elements are extended and permit the lower stringer to lie on the ground when they are retracted. The conveyor frame also has, between the segments of the conveyor frame disposed in the front region of the conveyor, steering cylinders which are adapted to adjust the angle between these segments.

Conveyor systems of the above kind, being of relatively complicated design and construction tend to be relatively expensive to manufacture and maintain.

OBJECTS OF THE INVENTION

It is accordingly an object of the invention to provide a self-propelled articulated continuous haulage system which provides a useful alternative to prior art machines.

A further object of the invention is to provide a self-propelled articulated continuous haulage system which endeavours to meet the criteria set out in the introduction to this specification and which is relatively simple and inexpensive in construction and reliable in operation.

SUMMARY OF THE INVENTION

According to the invention a self-propelled continuous haulage system comprises an elongated articulated body made up of a plurality of support frames aligned in end to end abutting relationship, a conveyor system carried by and supported centrally on the support frames, traction means in the form of a pair of endless traction chains carried on opposite sides of the support frames and spanning the length of the body, the chains engaging the ground in an operative condition of the system, and drive means for driving the chains to provide tractive and steering effort for the system.

Preferably each traction chain has an upper run and a ground-engaging lower run, wherein the lower run of each traction chain is located at least in part along one side of the body of the haulage system and the upper run thereof is located at least in part along its opposite side.

Preferably the traction chains cross over with respect to one another at each end of the haulage system.

Preferably the upper run of each traction chain is carried in chain guides located above ground level and the lower, ground engaging run passes under sheave wheels. The sheave wheels are preferably mounted in pairs on yokes, each yoke being pivoted to a support frame for movement in a vertical plane.

The drive means may comprise drive sprockets driven by electrical or hydraulic motors located at teach end of the elongated body. Booster drives may be located at regular intervals along the length of the body of the haulage system. Hydraulic tensioners may be provided to act on the traction chains to tension them.

The conveyor system carried by and supported on the support frames preferably comprises a multiplicity of belt sections arranged in end to end overlapping relationship, means for connecting adjacent belt sections to permit relative lateral displacement therebetween and means for advancing the endless conveyor system in orbital fashion centrally along the length of the body of the haulage system in such a manner that the conveyor system has an upper load carrying run and a lower return run.

Preferably each belt section is connected to an associated carrier member and adjacent carrier members are connected to a conveyor chain located centrally on the continuous haulage system, drive means being provided for driving the conveyor chain in orbital fashion.

BRIEF DESCRIPTION OF THE DRAWINGS

Preferred embodiments of the invention will now be described by way of example with reference to the accompanying drawings in which.

DESCRIPTION OF PREFERRED EMBODIMENTS OF THE INVENTION

Figure 1:
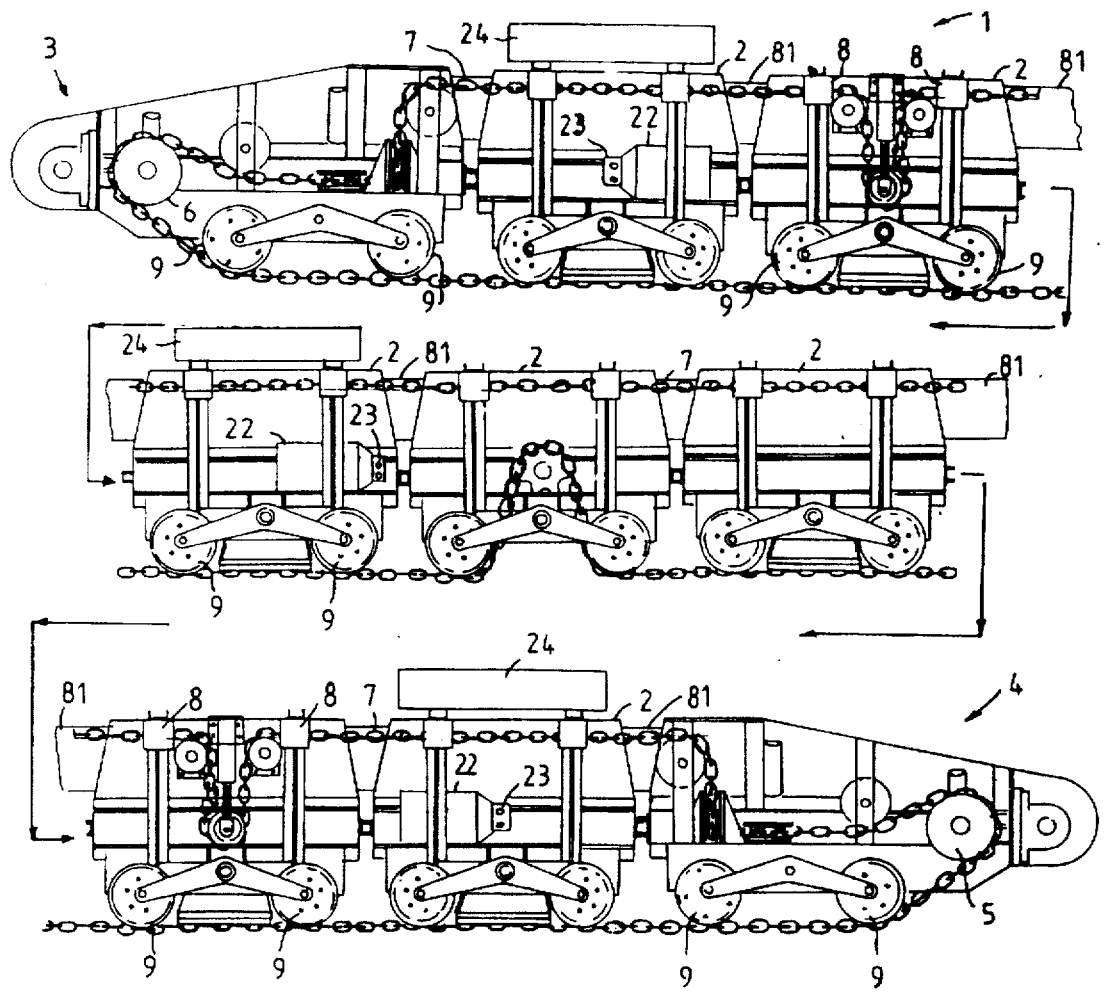
FIG. 1 is a side view of part of a continuous haulage system constructed according to the invention and shown in sections.
Figure 2:
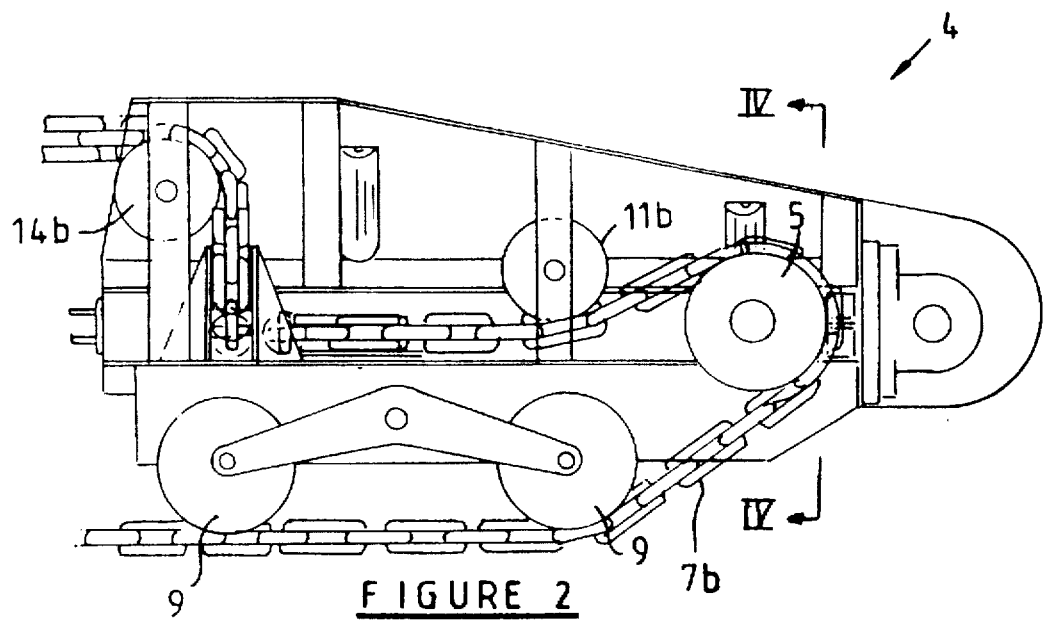
FIG. 2 is a side view of an end frame of the haulage system showing the arrangement of the traction chains of the system.

In the drawings like parts are identified by like numerals and various parts are omitted where appropriate, for the sake of clarity.

A self-propelled continuous haulage system 1 comprises an elongated articulated body made up of a plurality of support frames 2 aligned in end to end abutting relationship (FIG. 1). A loading end frame 3 is located at one end of the haulage system and a discharge end frame 4 is located at the opposite end thereof. In this embodiment of the invention the end frames 3, 4 are of the same construction but they need not necessarily be so. The end frames 3, 4 each carry a pair of drive and steering sprockets 5, 6 respectively located at the sides of the frames (FIGS. 1-5).

Figure 10:
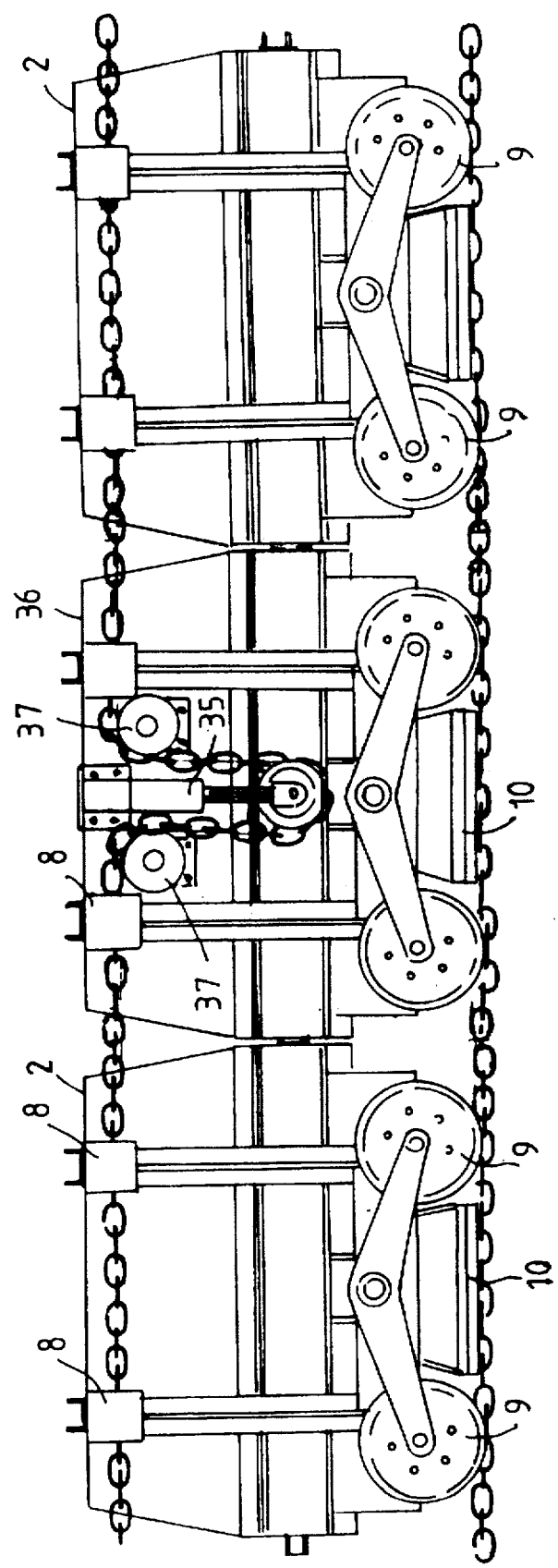
FIG. 10 is a side view of part of the haulage system of FIG. 1 illustrating an hydraulic tensioner for a traction chain.
Figures 11A, 11B:
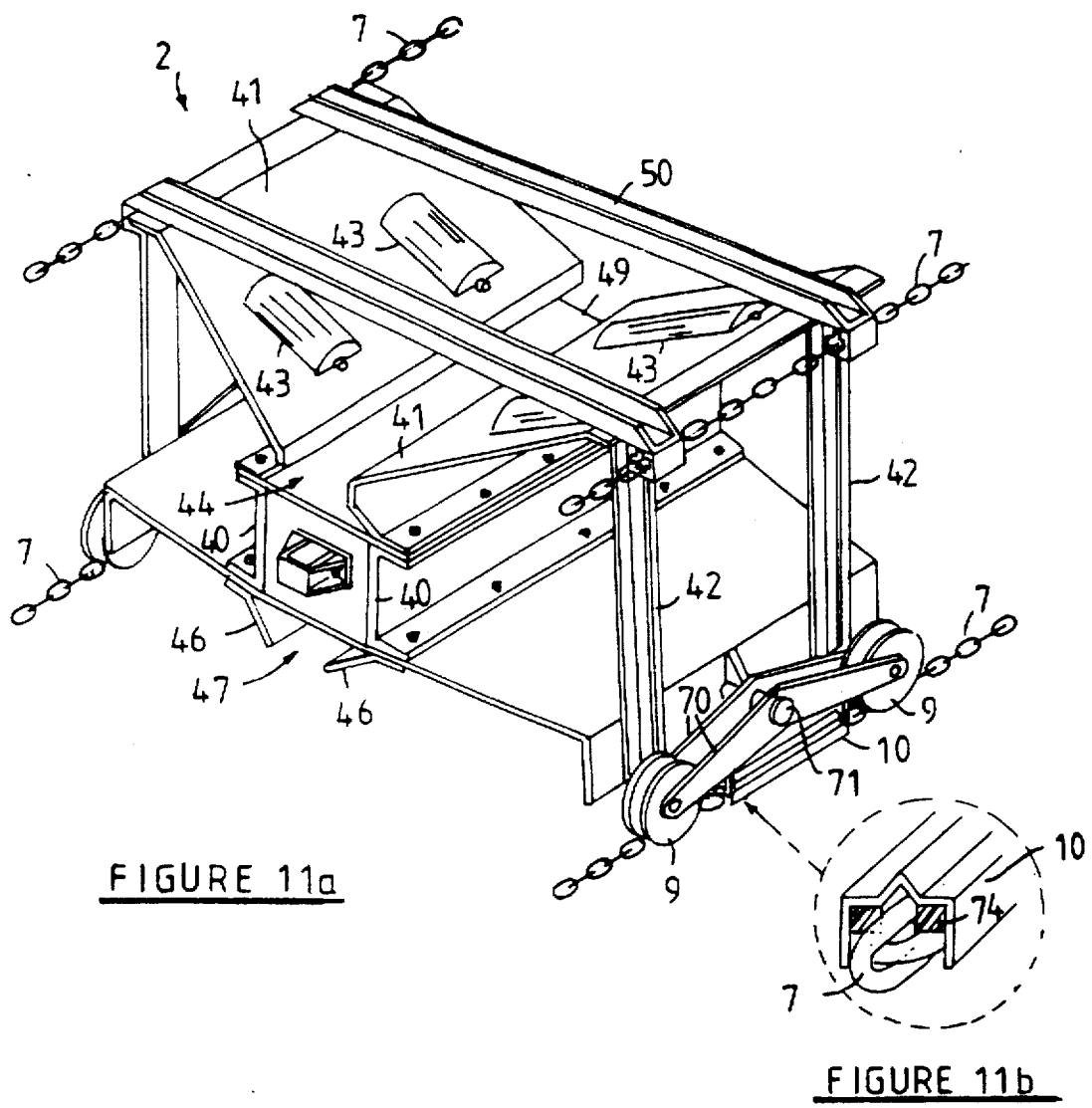
FIG. 11a is a perspective view of an individual support frame of the haulage system of FIG. 1.
FIG. 11b is an enlarged detail of part of a chain guide used on the support frame.

A pair of endless round link traction chains 7 is located at the sides of the body of the haulage system, spanning the length thereof and passing over the sprockets 5,6. The traction chains 7 have an upper run carried in upper chain guides 8 located above ground level and a lower, ground engaging run passing under sheave wheels 9 (FIGS. 1, 10, 11a). The lower run of the chains 7 may optionally also pass under channel guides 10.

The arrangement of the traction chains 7 is characterized in that each chain has its lower run located along one side of the support frames 2 and its upper run located along the opposite side thereof. This is achieved by diverting the lower run of each chain from one side of the haulage system to the other side at each of the loading end frame 3 and discharge end frame 4. Thus, as shown in FIGS. 2–5, the traction chain 7a passes from its lower run to its upper run over the drive and steering sprocket 6, under a sheave wheel 11a, past a sheave wheel 12a, under a sheave wheel 13a and over a sheave wheel 14a. The traction chain 7b likewise passes over the drive and steering sprocket 5, under a sheave wheel 11b, past a sheave wheel 12b, under a sheave wheel 13b and over a sheave wheel 14b.

Figure 6:
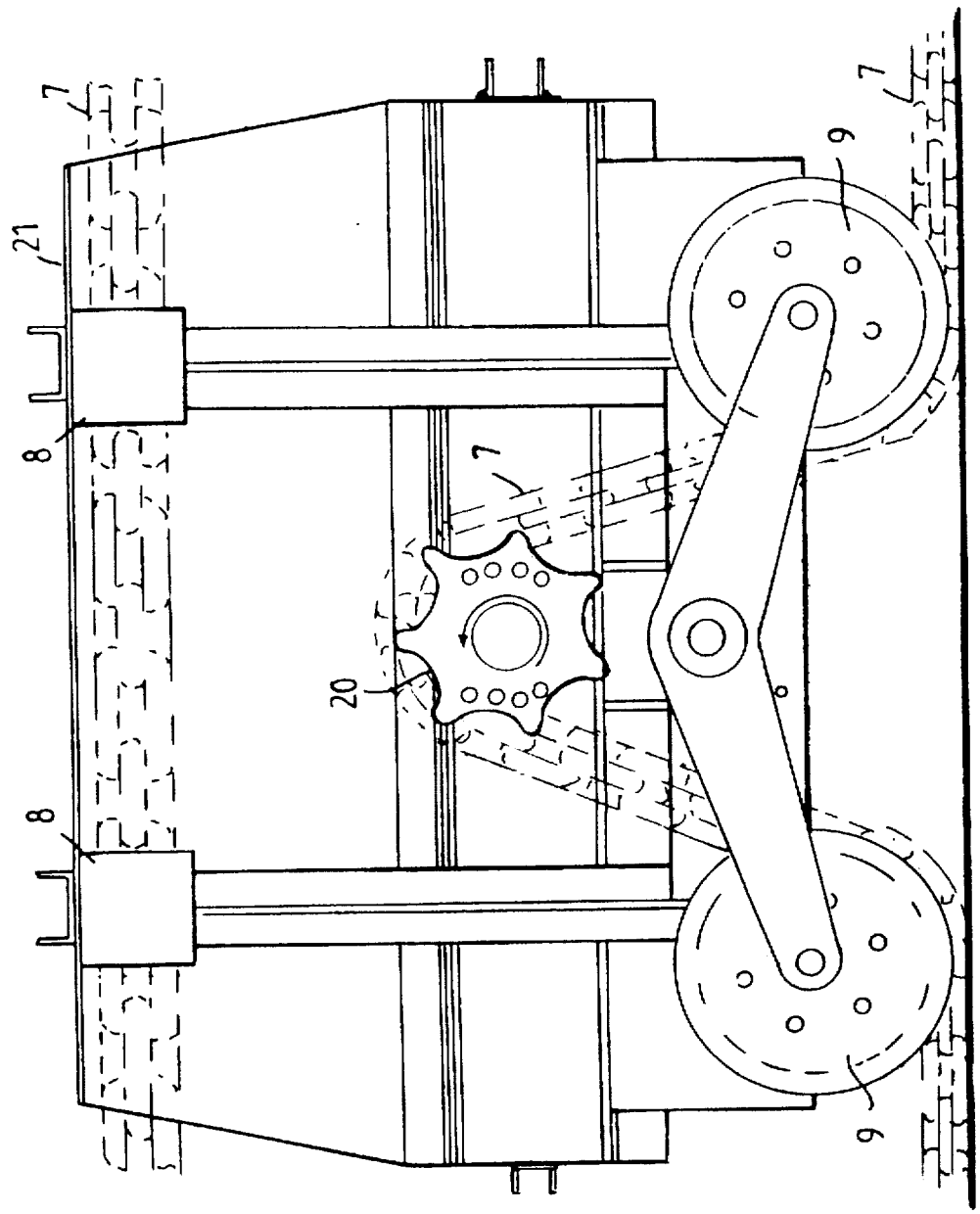
FIG. 6 is a side view of a support frame of the haulage system carrying a booster drive for a traction chain of the haulage system.
Figure 7:
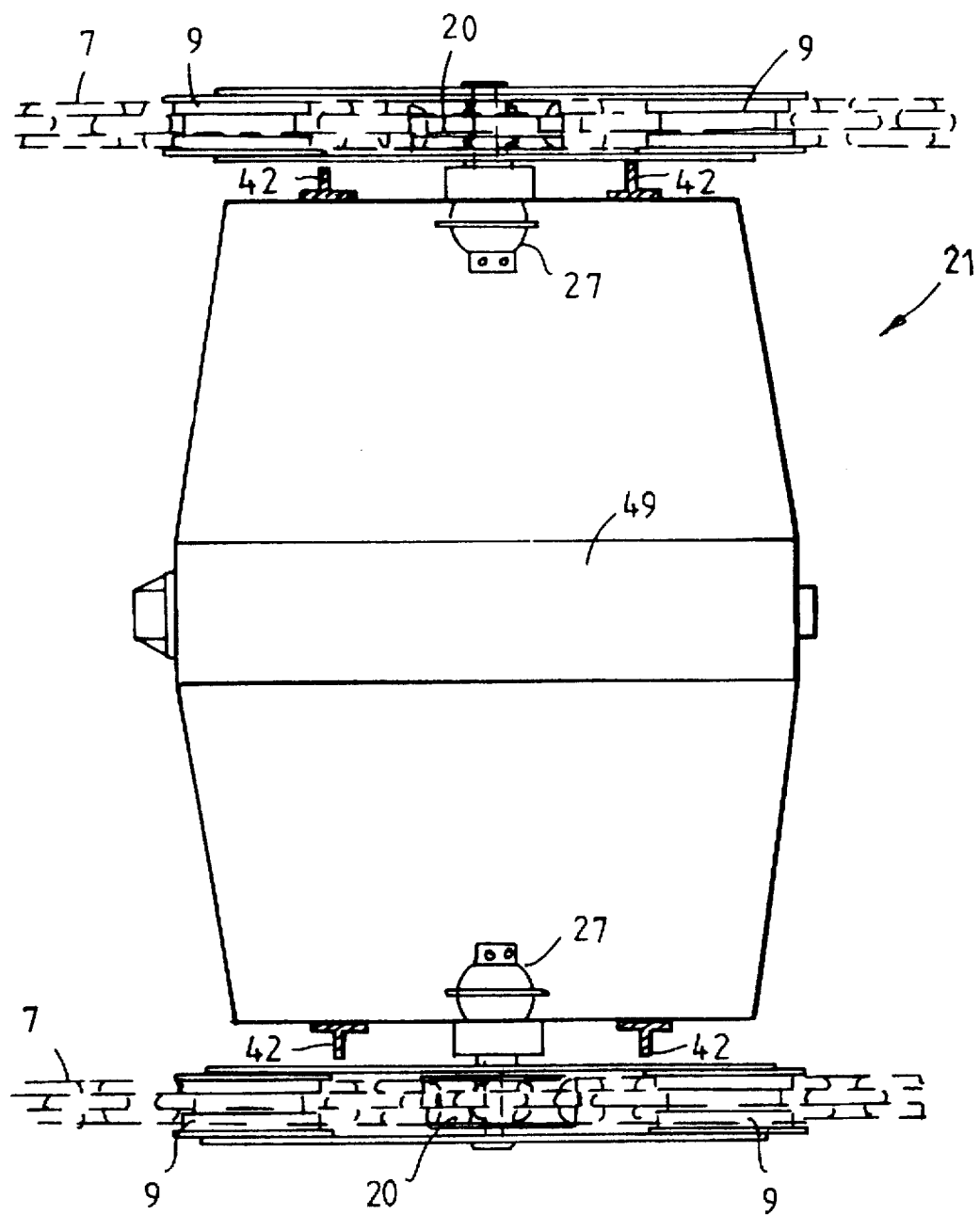
FIG. 7 is a plan view of the support frame of FIG. 6 in which parts have been removed for the sake of clarity.

At regular intervals along the length of the body of the haulage system intermediate drive sprockets 20 are provided on intermediate drive frames 21 of the haulage system (FIGS. 6, 7). The intermediate drive sprockets 20, over which the traction chains 7 pass, serve as booster drives for the traction chains.

The drive and steering sprockets 5, 6 and the intermediate drive sprockets 20 may be driven by suitable electric or hydraulic means. In this embodiment of the invention, electric motors 22 are provided which drive hydraulic pumps 23 fed from reservoirs 24 (FIG. 1). The hydraulic pumps 23 are hydraulically connected to hydraulic motors 25, 26 which drive the drive sprockets 5, 6 respectively and to hydraulic motors 27 which drive the intermediate drive sprockets 20 (FIGS. 1, 3, 4, 5, 7).

Figure 8:
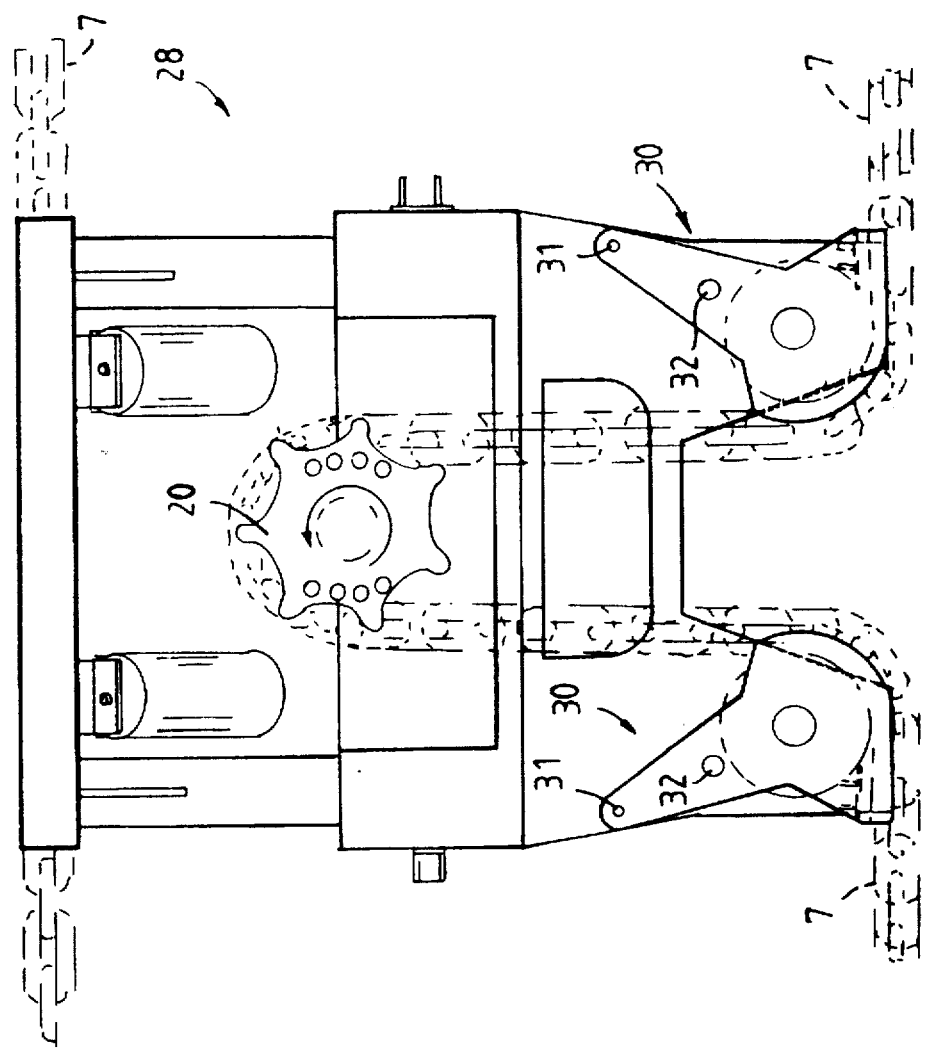
FIGS. 8 and 9 are side views of an alternative support frame of the haulage system embodying a pair of chain guides in operative and inoperative positions respectively.
Figure 9:
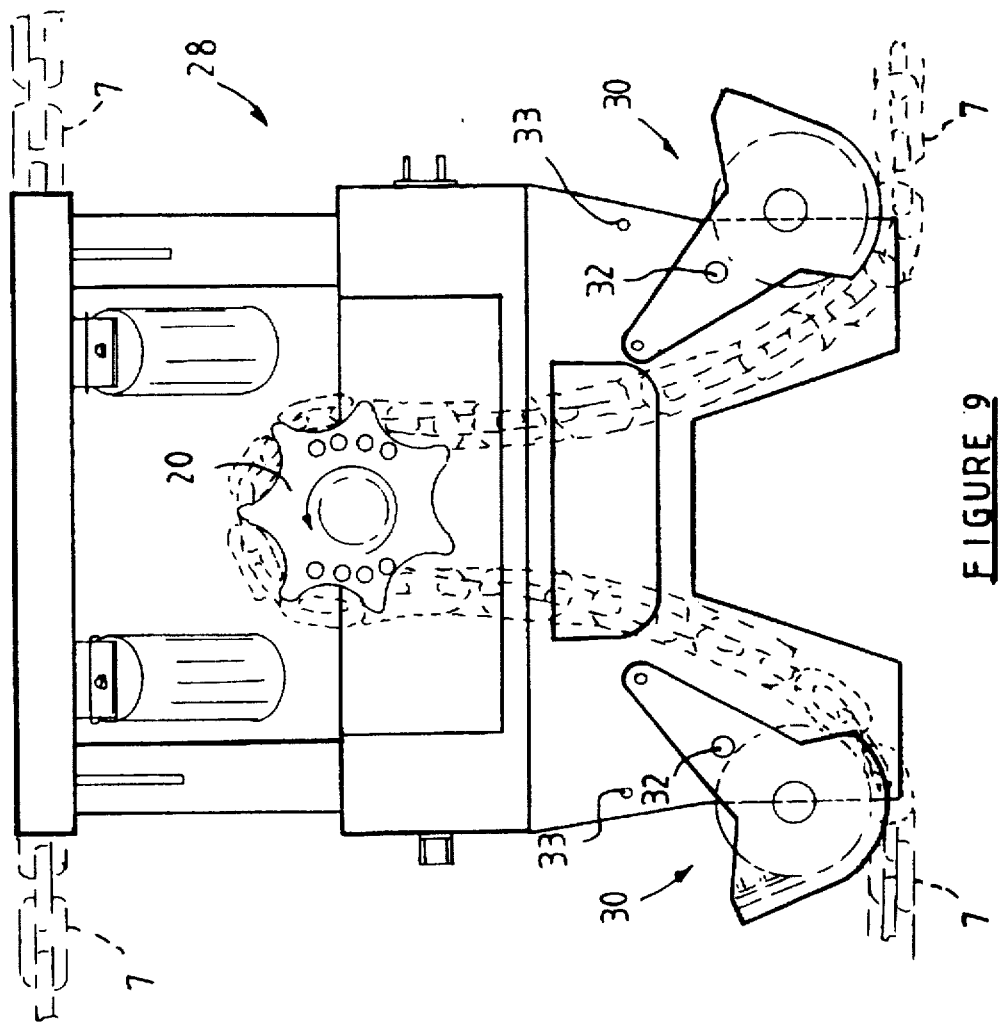

In an alternative arrangement shown in FIGS. 8 and 9, an intermediate drive frame 28 is provided of different construction to the intermediate drive frame 21 shown in FIGS. 6 and 7. In this arrangement, the traction chain 7 passes over the intermediate drive sprocket 20 via chain guides 30. The chain guides 30, which have a bell-shaped profile, are pivoted to the intermediate drive frame 28 by means of pivots 32. In their operative position shown in FIG. 8, the guides 30 are secured in position by means of studs 31 which locate in holes 33 in the frame 28. When the studs are withdrawn the guides 30 can be pivoted outwardly as shown in FIG. 9 to provide slack in the chain 7 to enable it to be lifted from the sprocket 20. This facilitates servicing or replacement of the sprockets 20 and the motors 27.

Hydraulic or mechanical take-up tensioners 35 are mounted on tensioner frames 36 which may be of similar construction to the support frames 2 of the the haulage system (FIG. 10). The tensioners 35, over which the traction chains 7 pass via sheave wheels 37, serve to maintain suitable tension on the traction chains during use of the haulage system.

Suitable control means (not shown) are provided to operate the hydraulic motors 25, 26, 27 to drive the traction chains 7, both separately and in unison, to achieve tramming and steering of the haulage system 1. Tramming is achieved by driving the traction chains simultaneously and steering is achieved by driving one traction chain in preference to or faster than the other chain.

When negotiating turns, any slack which would normally occur on the inner traction chain 7, is automatically compensated for because the chains cross over from one side of the haulage system to the opposite side thereof, as described above.

Turning of the haulage system 1 does therefore not create slack in the traction chains 7.

Figure 12:
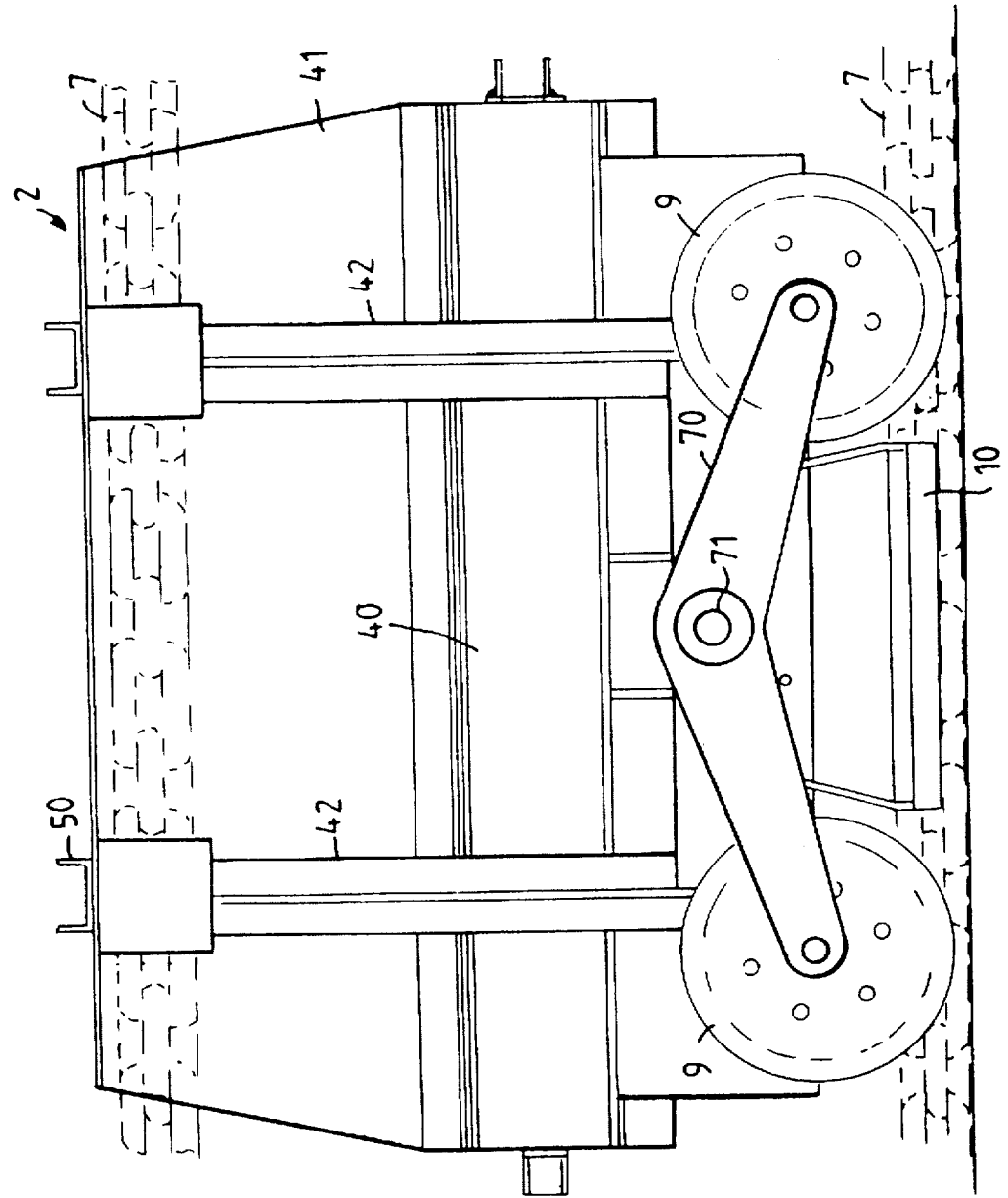
FIG. 12 is a side view of the support frame of FIG. 11.
Figure 13:
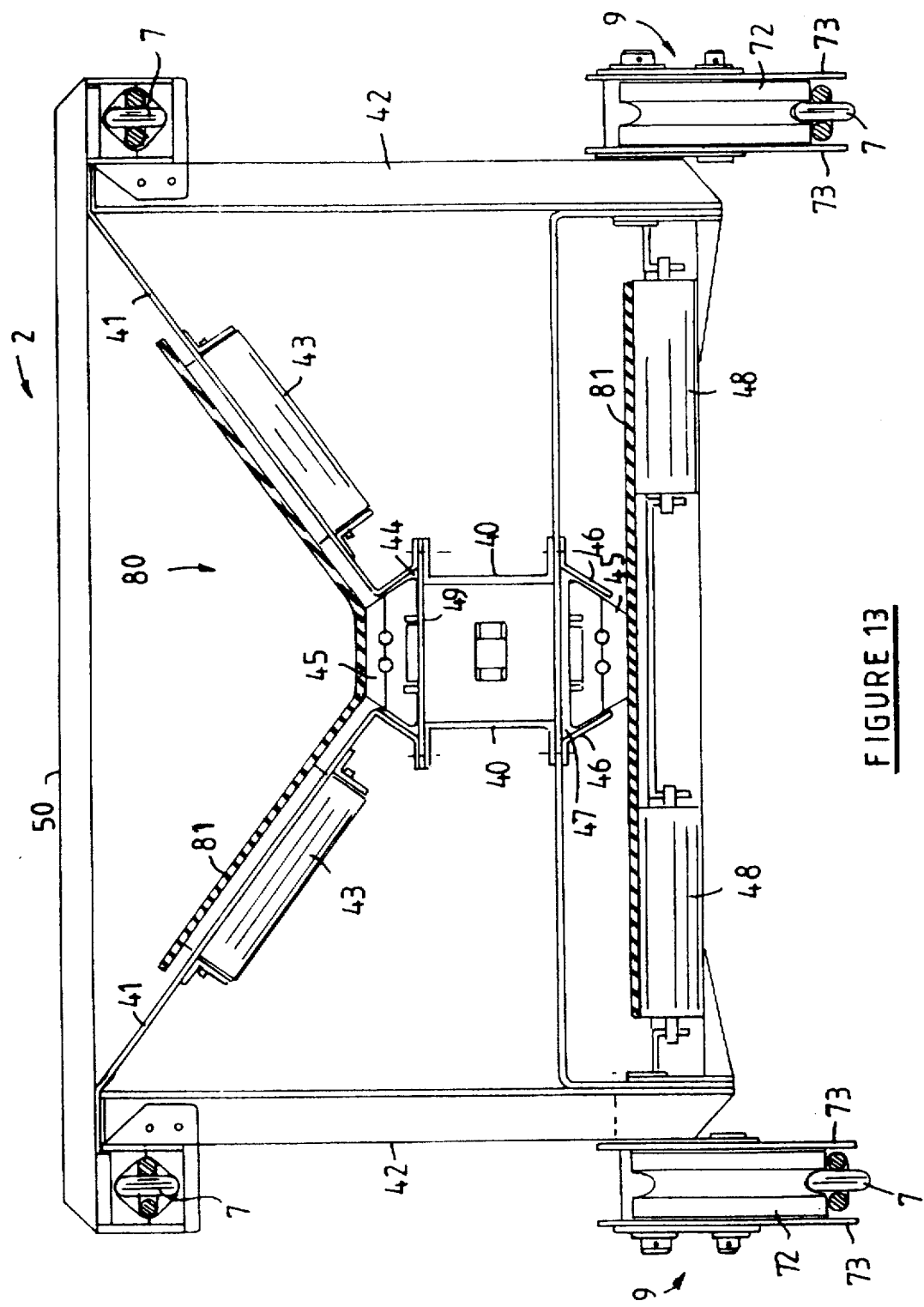
FIG. 13 is an end view thereof, carrying a conveyor system.

Each support frame 2 of the haulage system 1 comprises a pair of beams 40 on which are mounted a pair of diverging upper mounting plates 41 supported on posts 42 (FIGS. 11a, 12, 13). Idler rollers 43 project through apertures in the mounting plates 41. At their lower ends the mounting plates 41 are shaped to form a guide channel 44 for carrier members 45 which are more fully described hereunder. Below the beams 40 guide plates 46 are provided which are similarly shaped to form a return guide channel 47 for the carrier members 45. Below the return guide channel 47 idler rollers 48 are mounted on the support frame 2 (FIG. 13).

A removable wear plate 49 is provided which forms the base of the guide channel 47 and on which the carrier members 45 seat (FIG. 13).

Beams 50 are mounted on the support frames 2 spanning the mounting plates 41.

The support frames 2, end frames 3, 4, intermediate drive frames 21 and tensioner frames 36 are linked by flexible couplings 52 to permit limited relative universal movement between adjacent frames (FIGS. 14–17). The flexible couplings 52 enable the haulage system to flex in three dimensions to negotiate uneven mining terrain.

Figure 14:
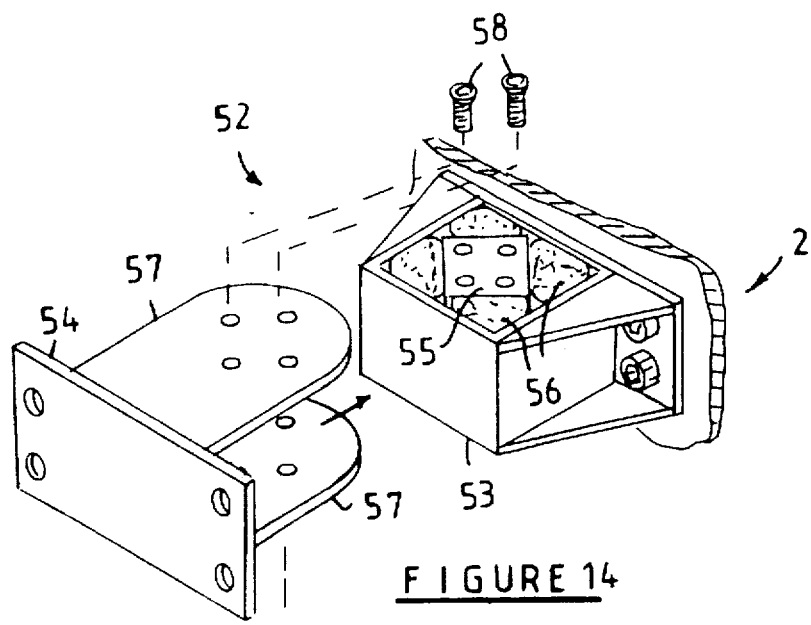
FIGS. 14 and 15 are perspective views of parts of a support frame showing how adjacent support frames are linked together.
Figure 15:
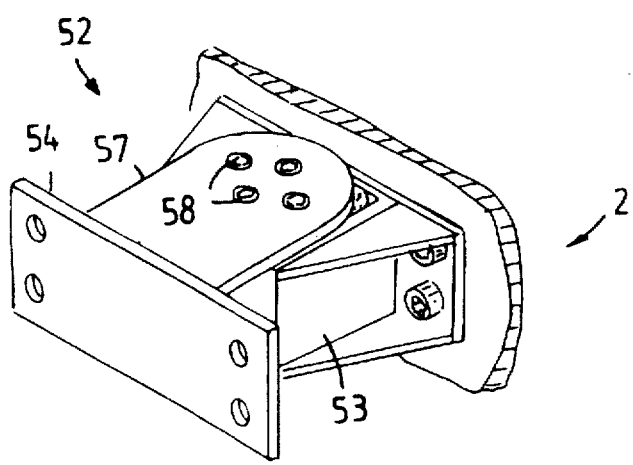
Figure 16:
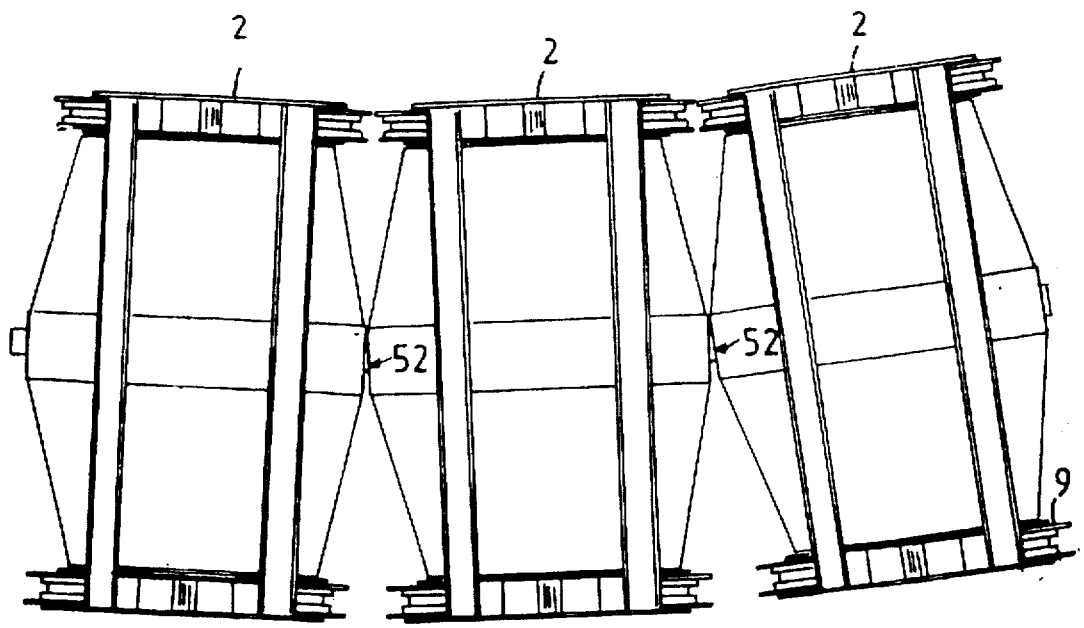
FIGS. 16 and 17 are plan and side views respectively of support frames of the haulage system illustrating the flexibility of the elongated body of the haulage system.
Figure 17:
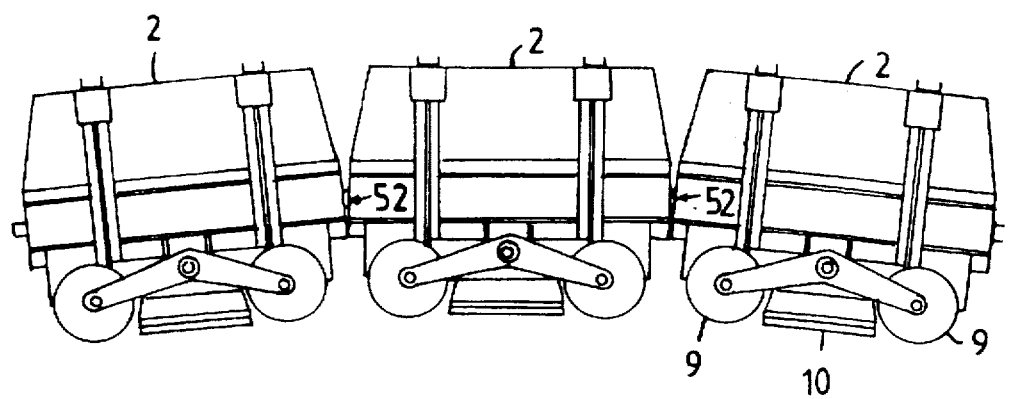

Each flexible coupling 52 may be of conventional, commercially available construction, consisting of a coupling box 53 and a connector 54 (FIGS. 14, 15). The coupling boxes 53 may, for example, be mounted on the front ends of the support frames 2, intermediate drive frames 21 and tensioner frames 36, whilst the connectors 54 may be mounted on the rear thereof. The coupling box 53 houses a steel core 55 surrounded by rubber cushions 56. The connector 54 has parallel flanges 57 which overlie the coupling box 53 in an operative position, enabling the flanges to be bolted to the core 55 by means of bolts 58. Alternative forms of coupling the frames together may be used, such as ball and socket formations (not shown).

Figure 18:
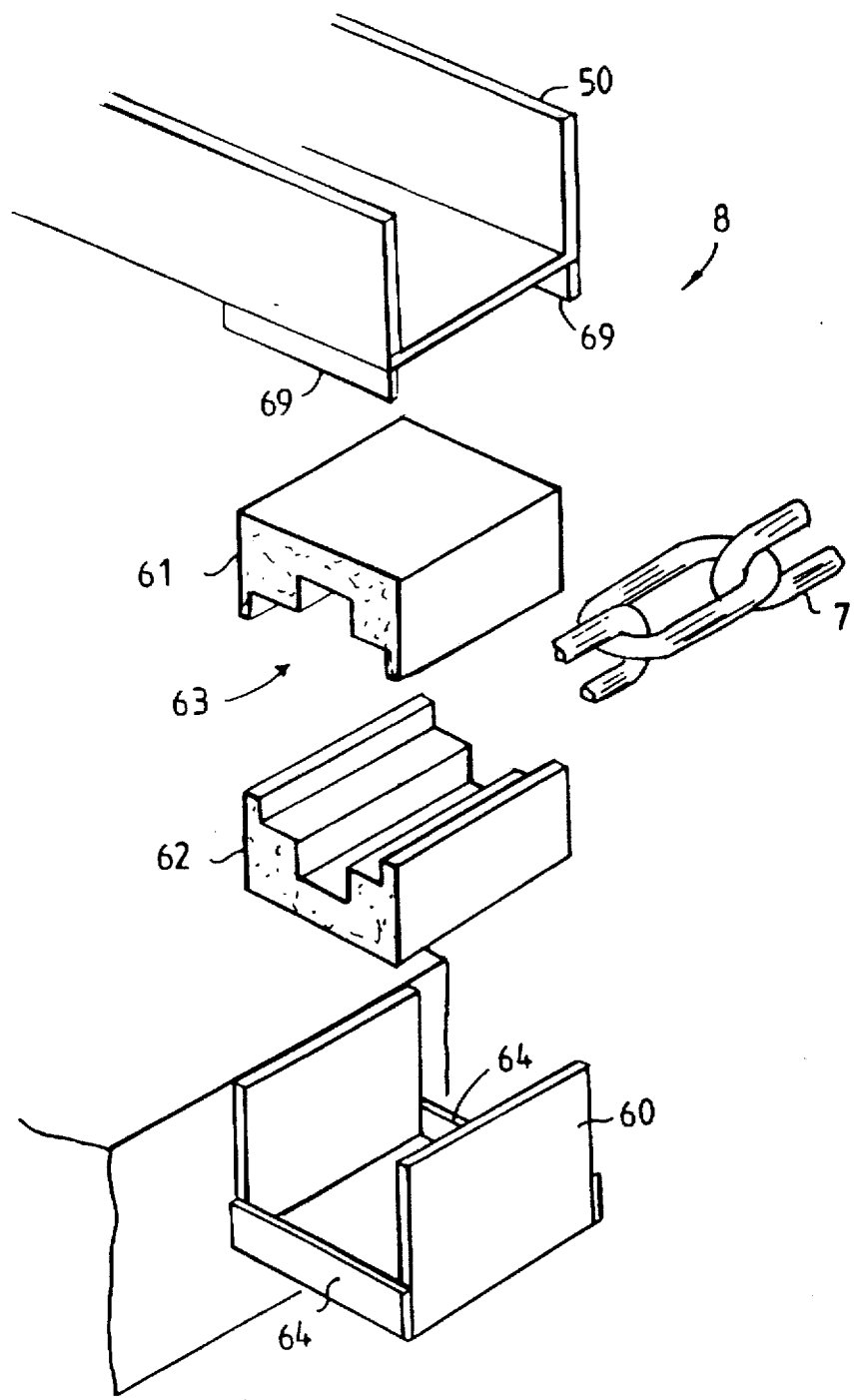
FIG. 18 is an exploded perspective view of a chain guide mounted on a support frame for the upper run of a traction chain of the haulage system.

As stated above, each traction chain 7 has an upper run located in upper chain guides 8 and a lower, ground engaging run passing under sheave wheels 9 and channel guides 10. As shown in FIG. 18, each chain guide 8 comprises a housing 60 adapted to receive a pair of wear pads 61, 62. The wear pads define between them an opening 63 of cross configuration which is shaped to accommodate the links of a traction chain 7. The lower wear pad 62 seats on the base of the housing 60 where it is trapped by side walls 64 whilst the upper wear pad 61 is held in position by a beam 50 which has dependant flanges 69 preventing dislodgment of the upper wear pad. The wear pads 61, 62 may conveniently be made of a hard wearing, low-friction material such as SOLIDUR (Registered Trade Mark).

The sheave wheels 9 under which the traction chains 7 pass are mounted in pairs on yokes 70 (FIGS. 11a, 12). Each yoke 70 is pivoted to a support frame 2, end frame 3, intermediate drive frame 21 or tensioner frame 36, as the case may be, by means of a pivot 71 for movement in a vertical plane. Each sheave wheel 9 comprises a grooved disc 72 located between a pair of face plates 73 (FIG. 13). The sheave wheels 9, mounted in the manner described, serve to lessen frictional forces on the traction chains 7 and further serve to prevent the traction chains 7 from being displaced laterally relative to the haulage system in use of the system.

Optionally, a channel guide 10 is provided between the sheave wheels 9 to assist further in preventing lateral displacement of the traction chains 7. The channel guides 10 may be mounted on the yokes 70 carrying the sheave wheels 9 and are preferably fitted with wear pads 74 made of the same material as the wear pads 61, 62 referred to above (FIG. 11b).

Figure 19:
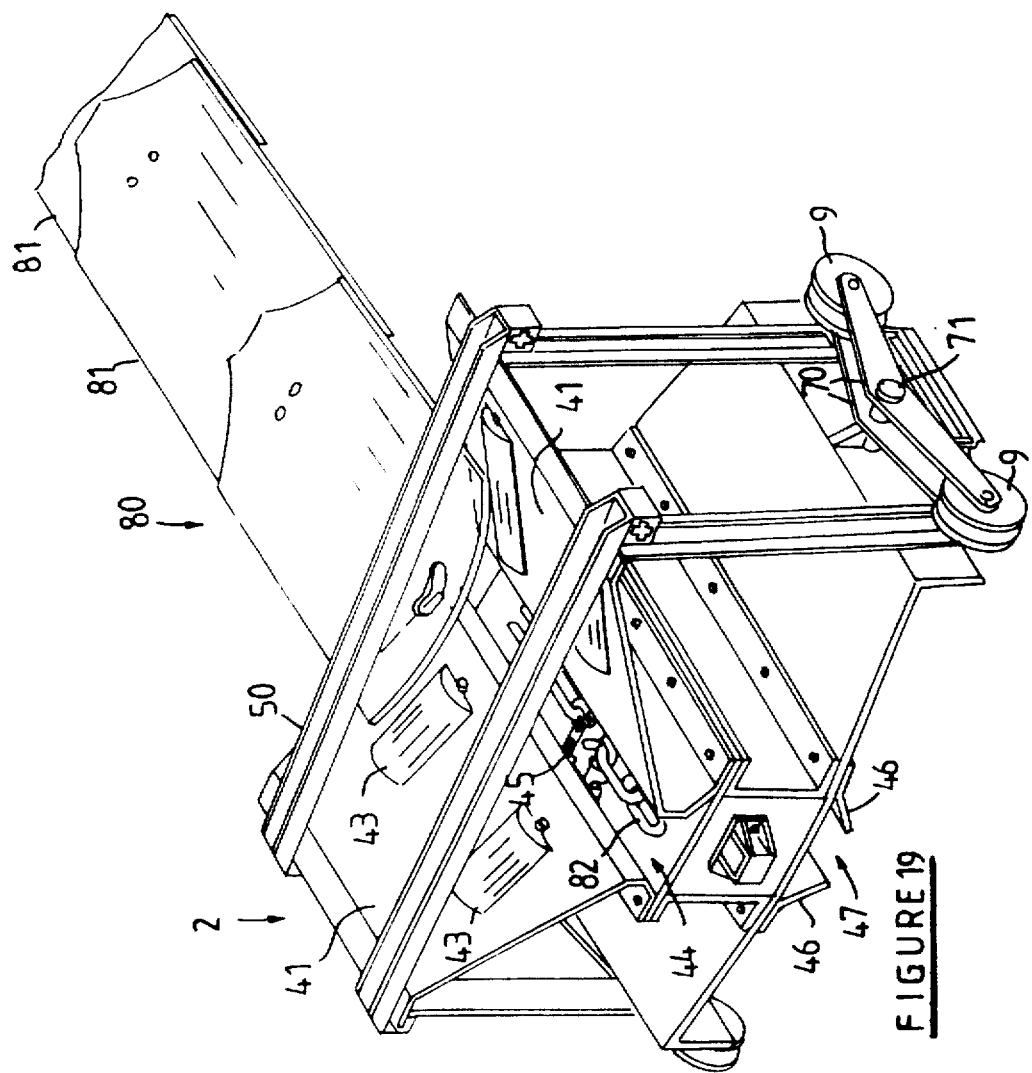
FIG. 19 is a perspective view of a support frame of the haulage system illustrating part of a conveyor system carried by the haulage system.
Figure 20:
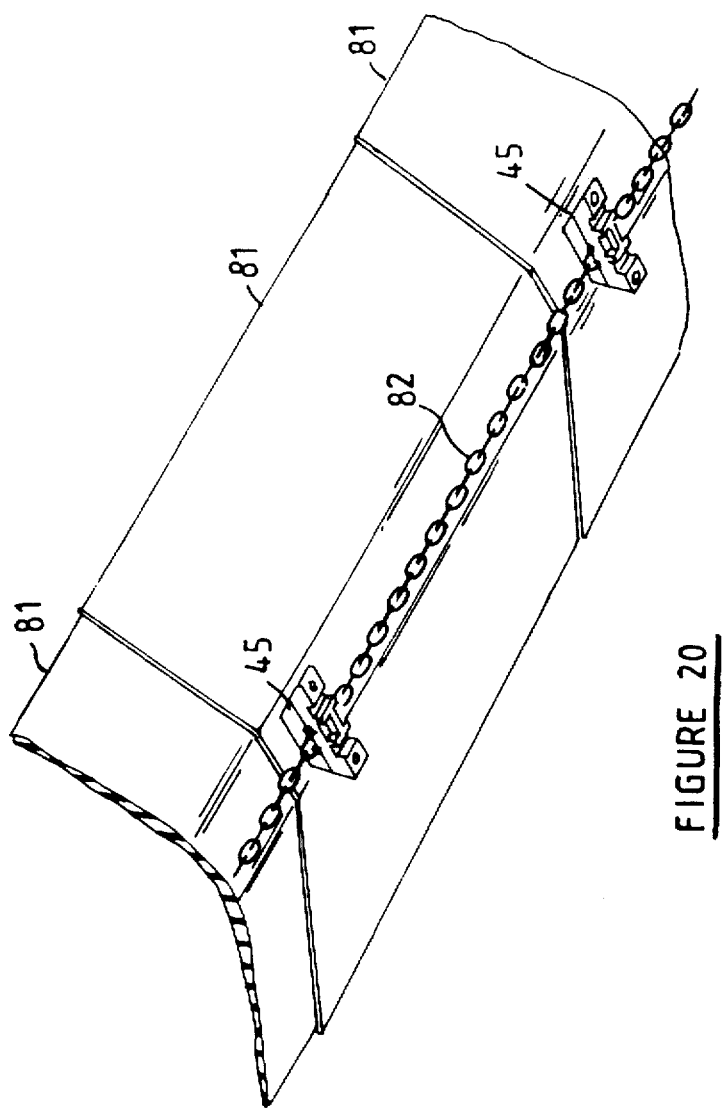
FIG. 20 is a perspective view from below of part of the conveyer system of the haulage system.
Figure 22:
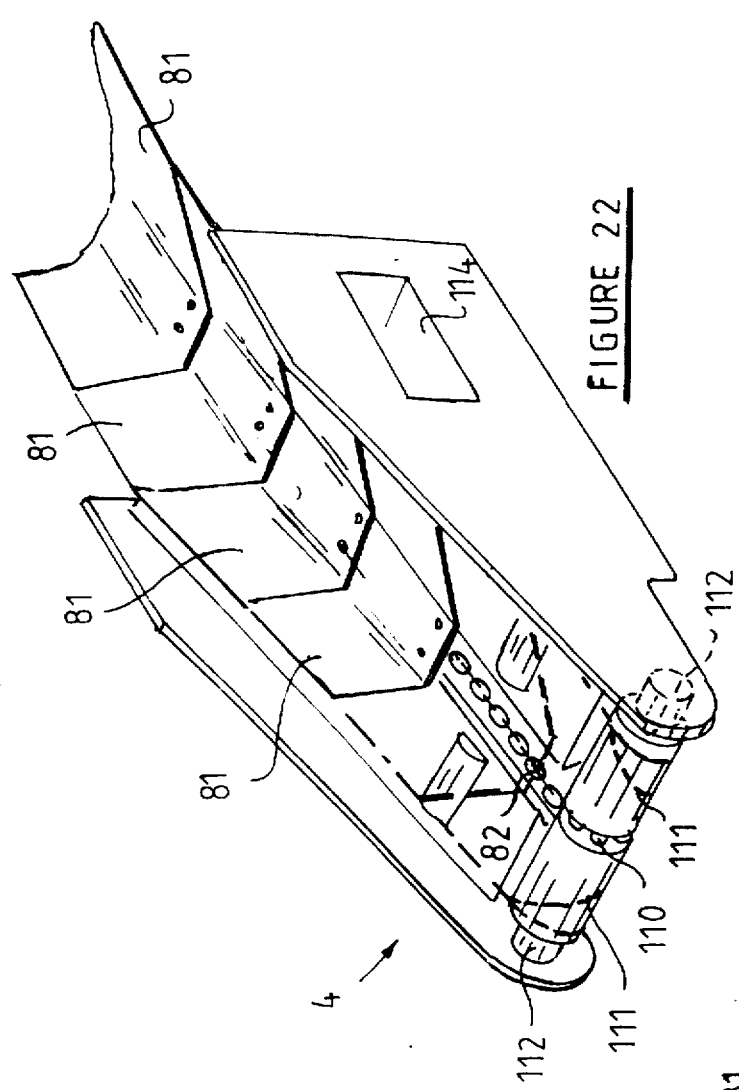
FIG. 22 is a perspective view of an end frame of the haulage system without the traction chains and other parts thereof, further illustrating the conveyor system of the haulage system.

The elongated body of the haulage system 1 which is made up of the support frames 2, the end frames 3, the intermediate drive frames 21 and the tensioner frames 36, serves to carry and support an endless conveyor system 80 (FIGS. 19, 20, 22). The conveyor system 80 is made up of conveyor belt sections 81 arranged in end to end overlapping relationship and drawn by a round link conveyor chain 82 running centrally along the haulage system in the guide channels 44, 47 and to which the carrier members 45 are fixed at spaced intervals.

Figure 21:
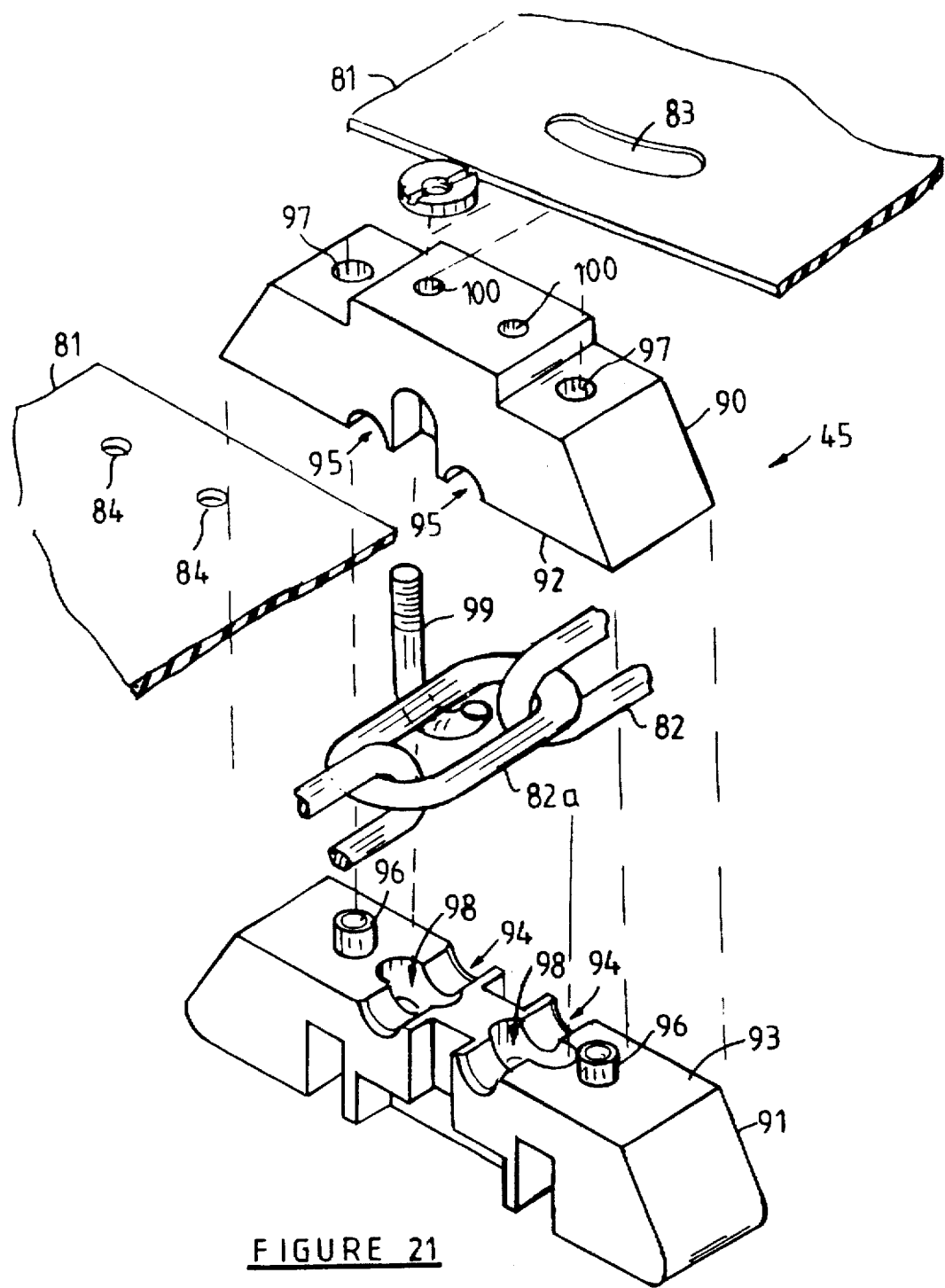
FIG. 21 is an exploded perspective view illustrating the manner in which belting making up the conveyor system is fixed to a carrier of the conveyor system.

Each belt section 81 has an oval aperture 83 adjacent its rearward end and a pair of holes 84 adjacent its forward end (FIG. 21). In an operative position, the forward end of each belt section 81 overlies the aperture 83 of the adjoining, underlying belt section where the overlying belt section is bolted to a carrier member 45 through the bolt holes 84. This is achieved in this embodiment of the invention by means of a pair of bolts 99 (only one of which is shown in FIG. 21) emerging from holes 100 in the carrier member 45.

Each carrier member 45 comprises upper and lower parts 90, 91 having faces 92, 93 respectively which meet in an operative condition of the carrier member (FIG. 21). The faces 92, 93 have recesses 94, 95 respectively therein which are so formed that when the faces meet, the recesses accommodate and trap a link 82a of the conveyor chain 82 therein. The lower part 91 of the carrier member 45 has ferrules 96 mounted thereon which are received in holes 97 in the upper part 90 and through which the parts 90, 91 can be bolted together. Sockets 98 are provided in the recesses 94 of the lower part 91 which serve to receive the hook sections of the pair of hook bolts 99 which are trapped in an operative position by the link 82a of the chain 82. The hook bolts 99 pass through holes 100 in the upper part 90 where they are used to secure a belt section 81 to the carrier member 45, as described above.

With this arrangement, adjoining belt sections 81 are readily capable of swivelling relative to one another in their major planes, thereby giving the conveyor system 80 lateral flexibility to accommodate turning of the haulage system. The conveyor system also has flexibility to accommodate vertical articulation of the haulage system.

The conveyor chain 82 is driven at each end of the haulage system 1 by a sprocket 110 located between rollers 111 over which the conveyor belt sections 81 pass (FIG. 22).

Figure 3:
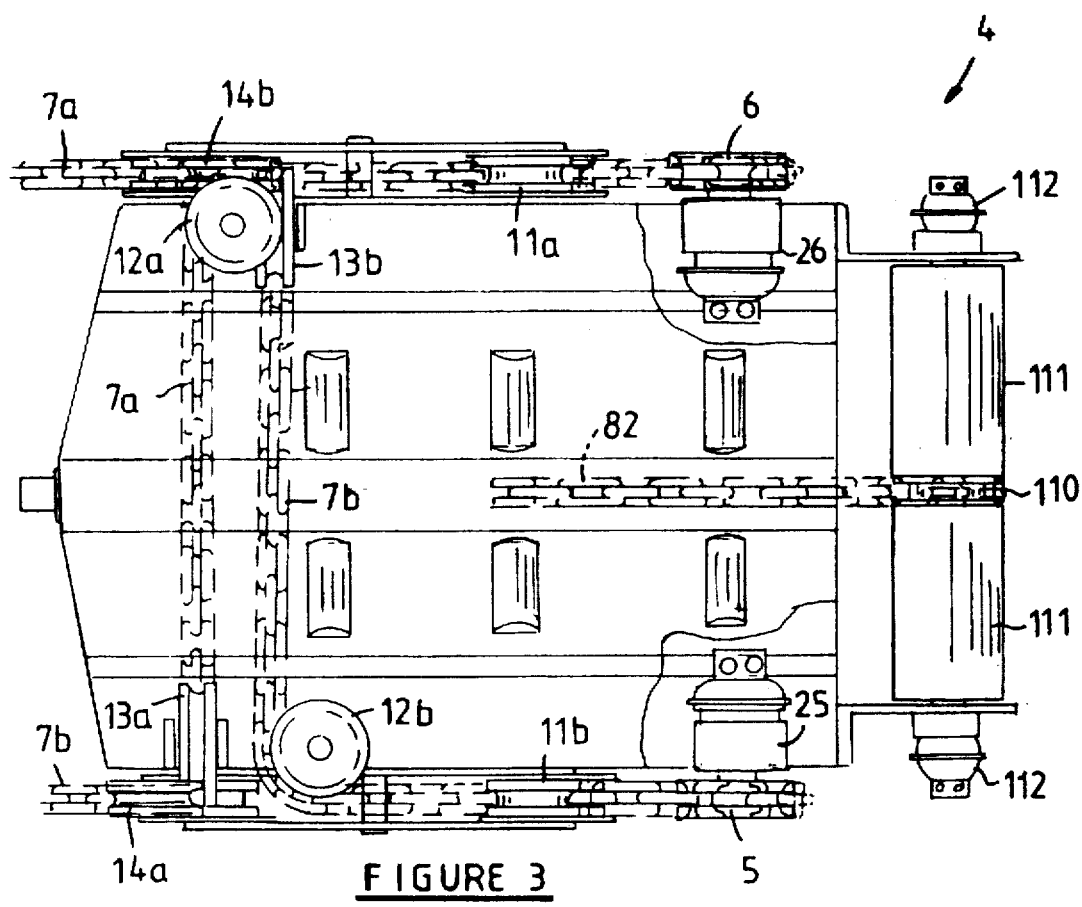
FIG. 3 is a plan view of the end frame of FIG. 2, with the traction chains shown in broken lines.
Figure 4:
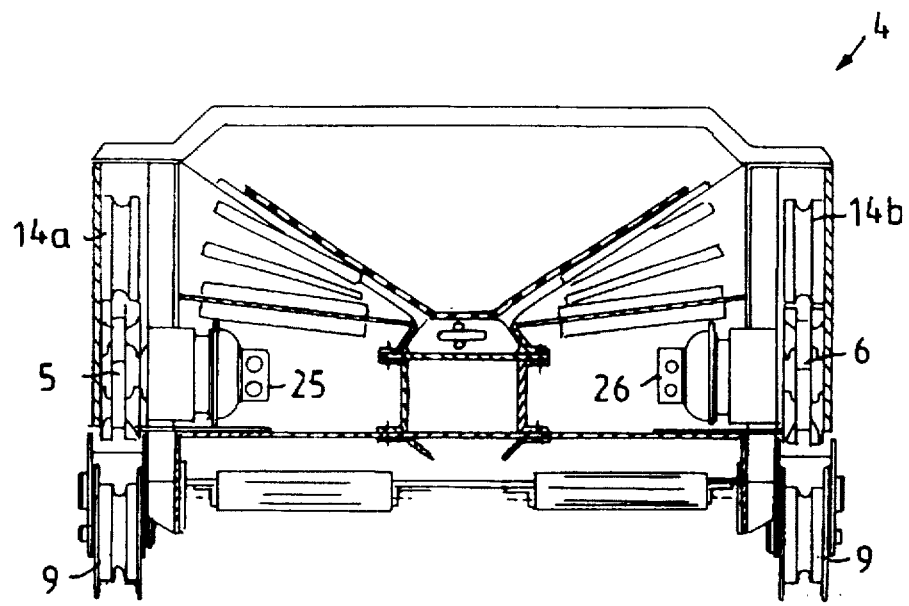
FIG. 4 is a section through the end frame taken on line IV—IV in FIG. 2, without the traction chains.
Figure 5:
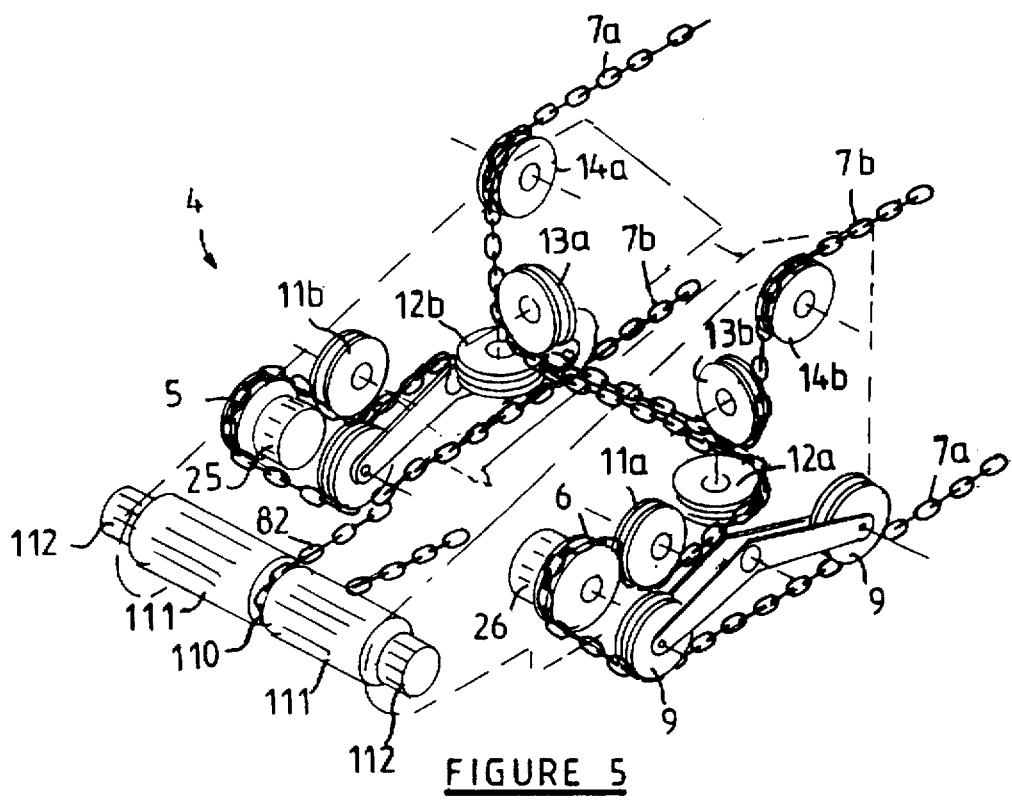
FIG. 5 is a schematic perspective view of the end frame of the haulage system showing the arrangement of the traction chains and how they cross over from one side of the frame to the other.

The sprockets 110 are driven in similar manner to the drive sprockets 5, 6, 26 described above, in this embodiment of the invention by hydraulic motors 112. In FIG. 22 the hydraulic motors are shown schematically as being located within the sides of the end frame but they can also be positioned as shown in FIG. 3.

In use of the conveyor system 80, the drive sprockets 110 located on the end frames 3, 4 are driven to rotate the conveyor chain 82 which advances the carrier members 45 along the guide channels 44 and 47 in orbital fashion. The conveyor system thus provides an upper load carrying run on the haulage system 1 in which the belt sections 81 fixed to the carrier members 45, are supported on the conveyor chain 82, on the idler rollers 43 and to some extent on the mounting plates 41, and a lower, return run in which the carrier members 45 are guided in the guide channels 47 and the belt sections 81 are supported on the idler rollers 48 (FIG. 13).

During use of the conveyor system 80, spillage of material being conveyed may occur as a result of such material working its way under the conveyor belt sections 81 and into the guide channels 44. In order to rid the system of such spilled material an opening (not shown) may be provided in the base 49 of the channel 44 of the discharge end frame 4 through which the spilled material is swept as the carrier members 45 pass the opening. Such material may be removed from the conveyor system by suitable discharge means (not shown), for example through a side opening 114 in the end frame 4 (FIG. 22). Should spillage of material occur on to the return section of the conveyor belt sections 81, such material will be carried on to the mounting plates 41. Spilled material on the mounting plates will gravitate to the guide channels 44 from where it will likewise be swept by the carrier members 45.

Figure 23:
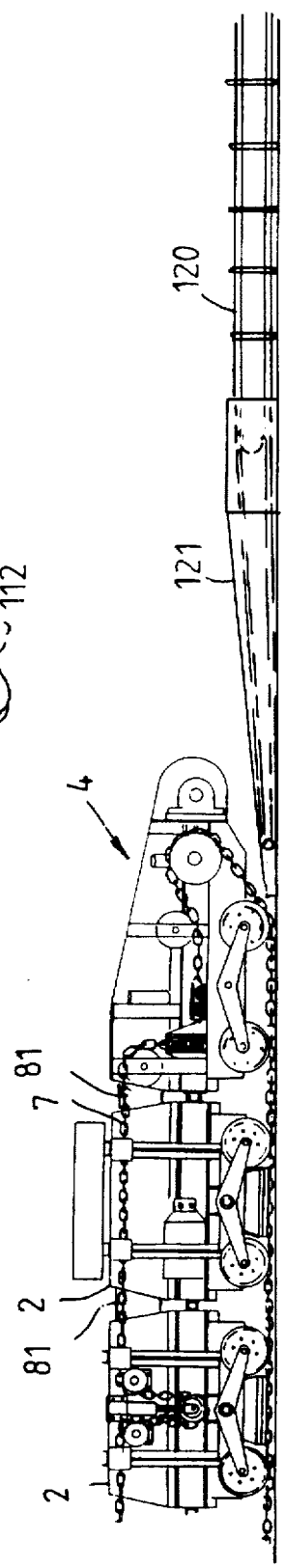
FIG. 23 is a side view of part of the haulage system approaching a ramp for purposes of discharging material.

Material carried by the conveyor system 80 is, in this embodiment of the invention, intended to be conveyed from a continuous mining machine (not shown) and discharged on to a main conveyor 120 (FIG. 23).

For this purpose a ramp 121 is provided flanking the main conveyor 120. In order to discharge material from the conveyor system 80, the haulage system 1 may be advanced up the ramp 121 until the discharge end frame 3 is suitably located above the main conveyor 120.

Other forms of discharge of material from the continuous haulage system may be employed. For example, the discharge end of the conveyor system 80 may be raised on the underlying support frames 2 by means of a suitable structure to give it sufficient elevation above ground level.

It is anticipated that the self-propelled haulage system described above will provide adequate maneuverability and will be capable of accommodating and negotiating uneven ground conditions. It is further anticipated that the system will be capable of negotiating turns of up to 360°. The haulage system is of robust yet relatively simple construction and it is anticipated that it will be capable of being manufactured and operated at relatively low cost.

Many other embodiment of the invention may be made without departing from the scope of the invention described in the appended claims.

We claim:

1. A self-propelled articulated continuous haulage system comprising: an elongated articulated body including a plurality of support frames aligned in end-to-end abutting relationship, a conveyor system carried by and supported centrally on the support frames, traction means in the form of a pair of endless traction chains carried on opposite sides of the support frames and spanning the length of the body, the traction chains engaging the ground in an operative condition of the system, and drive means for driving the chains to provide tractive and steering effort for the system.

2. A haulage system as claimed in claim 1 in which each traction chain has an upper run and a ground-engaging lower run, wherein the lower run of each traction chain is located at least in part along one side of the body of the haulage system and the upper run thereof is located at least in part along its opposite side.

3. A haulage system as claimed in claim 2 in which the traction chains cross over with respect to one another at each end of the haulage system.

4. A haulage system as claimed in claim 2 in which the upper run of each traction chain is carried in chain guides located above ground level and the lower, ground engaging run passes under sheave wheels.

5. A haulage system as claimed in claim 4 in which the sheave wheels are mounted in pairs on yokes, each yoke being pivoted to a support frame for movement in a vertical plane.

6. A haulage system as claimed in claim 1 in which the drive means comprise drive sprockets driven by electrical or hydraulic motors located at each end of the elongated body.

7. A haulage system as claimed in claim 6 in which booster drives are located at regular intervals along the length of the body of the haulage system.

8. A haulage system as claimed in claim 6 in which hydraulic tensioners are pivoted to act on the traction chains to tension them.

9. A self-propelled articulated continuous haulage system comprising: an elongated articulated body including a plurality of support frames aligned in end-to-end abutting relationship, a conveyor system carried by and supported centrally on the support frames, a pair of endless traction chains carried on opposite sides of the support frames and spanning the length of the body, the traction chains engaging the ground in an operative condition of the system, and a drive for driving the chains to provide tractive and steering effort for the system.

* * * * *